United States Patent Office
3,071,846
Patented Jan. 8, 1963

3,071,846
PROCESS FOR MAKING COILS
Adolph J. Wesolowski and William B. Penn, Erie, Pa., assignors to General Electric Company, a corporation of New York
No Drawing. Filed Oct. 30, 1958, Ser. No. 770,867
7 Claims. (Cl. 29—155.57)

This invention relates to a new process for making electrical coils. More particularly, it relates to a novel method for producing electrical coils which are resistant to elevated temperatures.

The making of electrical coils for operation in ordinary and moderately high temperatures up to the order of about 200° C. is relatively uncomplicated, the wire being coated with a flexible organic resin of suitable heat stability and wound into coil shape, the resin coating serving as the intra-turn insulation. However, at temperatures in excess of 200° C., the organic resins in general are unsuitable for use, since they tend to become degraded. Thus, materials such as the silicone type resins, glass, ceramic or inorganic type insulation are indicated for such higher temperatures. Unfortunately, in general, the higher temperature resistant materials are characterized by a lack of flexibility, so that if a wire coated with such material is bent or flexed as in forming a coil, the coating tends to crack and craze, destroying its usefulness as electrical insulation. This is particularly true in the case of glass served wire, which is practically impossible to form into coil shape without a resin to bond the glass surface, and is also lacking in the fact that, as mentioned above, when a suitably high temperature resistant resin is used to bond the serving, the resin itself tends to crack or craze during the process of making the coil. It is thus quite evident that an improved method for making high temperature resistant electrical coils of the above type is indicated.

A principal object of this invention is to provide a new and novel method for producing high temperature resistant electrical coils.

Briefly stated, the invention comprises applying to an electrical conductor a glass serving or layer, impregnating the glass layer with a flexible organic resin, forming the electrical conductor into the desired coil shape, treating the coil at an elevated temperature to volatilize or otherwise drive off the organic resin, and subsequently impregnating the coil and glass serving or layer on the individual conductors with a high temperature resistant material such as a silicone material, an organic phosphate or ceramic material.

Any of the usual organic resins which disintegrate or volatilize without residue at temperatures of the order of about 400° C. are useful in coating the glass served wire. Among such resins are the phenol-formaldehyde resins which may be prepared by using varying ratios of phenol and formaldehyde, polyvinylal resins such as those prepared by combining an aldehyde with a partially or completely hydrolyzed polymerized vinyl ester, phenol formaldehyde polyvinylal resins, oil-modified phenolic resins, butyral-modified phenolic resins, polyethylene, the acrylic resins, the epoxy or ethoxylene type resins, and polyester resins in general. Any of the usual electrically conductive materials may be used for the wire or conductor portion of the coil as desired, including but not limited to iron, copper, aluminum, nickel and alloys of these materials and other materials. While the invention is particularly adapted to the use of glass serving on the wire, inorganic materials such as asbestos or other fiber-like inorganic materials may be used. The term glass will be understood hereinafter to include such materials.

In making the coil, the electrical conductor is first coated or overlaid with a glass serving which may consist of parallel strands of glass wound in one or more layers on the conductor itself. Alternatively, the wire may be overlaid with glass cloth or tape. The glass serving or overlayer is next impregnated in any of the usual fashions as by spraying, dipping, brushing, etc., with an organic resinous material such as those described above, the resin serving to hold the rather friable glass coating in place and provide flexibility to the glass-coated conductor so that it may readily be formed into a coil of any desired shape or configuration without cracking or crazing. The conductor so coated and impregnated is next formed into the actual coil shape desired and then fired for about four hours or longer at a temperature of about 400° C. to 700° C. to completely volatilize or drive off the organic resin which impregnates the inorganic or glass wire coating. The resin removal process is, of course, of a time-temperature nature and those skilled in the art will readily adapt the time and temperature of treatment to the particular resin used. When the resin has been completely volatilized, there remains a coil, the interlayer or conductor insulation of which consists solely of the inorganic or glass fibrous material. Since this is of a porous nature, it is quite apparent that it must be further impregnated with a material which will fill the voids in the insulation and at the same time withstand the elevated temperatures of the order of 250° C. and higher which the coil must withstand.

It has been found that the high temperature resistant silicone varnishes or resins are very useful as high temperature impregnants for the coil, as are the various well-known inorganic phosphate materials, as well as ceramic materials or frits, all of which are well known to those skilled in the art.

The following will serve as an example of the preparation of the coils of the present invention, it being realized that it is merely illustrative of the invention and not to be taken as limiting in any way. Copper conductor wire about 30 mils in diameter was overlaid with parallel glass serving about 6 to 8 mils thick. The wire with the glass coating was then run through a solution of polyvinylal resin which was cured in the usual well known manner. Such resins are described, for example, in Patent 2,307,588 assigned to the same assignee as this invention. The wire was then formed into a cylindrical coil after which the entire assembly was heated for four hours at a temperature of 400° C. after which treatment only glass was left as a separator or spacer for the copper conductor turns. The coil as formed was next dipped into a 16 percent solids solution of silicone resin in xylene. The coil was slowly dipped into this varnish composition so as to obviate all air pockets so that the interlayer interstices between the conductors and in the glass serving would be entirely filled and impregnated. The coil was then drained for a short time to remove excess varnish and baked for one and one-half hours at 200° C. to cure the resin. The resultant coil was physically rugged, had desirable electrical characteristics and was resistant to temperatures well over 400° C. Other coils were similarly prepared except that in lieu of the silicone varnish a sodium silicate refractory cement was used which was fired for several hours at about 500° C. Once again a physically strong high temperature resistant coil having suitable electrical characteristics resulted.

By this invention there is provided a new and useful method for making electrical coils which are resistant to elevated temperatures, the glass-served conductor wires first being provided with a flexible resin layer which after the formation of the coil is removed by heating at elevated temperatures following which a high temperature resistant material is substituted for the flexible resin.

In the course of this process, another very desirable feature is obtained. That is, during the resin removal process at elevated temperatures, the conductor metal is annealed thus making it more pliable and facilitating handling in assembly. This applies particularly if the conductor metal is copper.

What we claim as new and desire to secure by Letters Patent of the United States is:

1. The method of forming an electrical coil which comprises overlaying a conductor with a serving of inorganic material, impregnating said serving with a flexible organic resin selected from the group consisting of phenolic resins, modified phenolic resins, polyvinylal resins, modified polyvinylal resins, acrylic resins, epoxy resins, polyethylene resins and polyester resins, curing said flexible resin, forming said conductor into a coil, heating said coil to destroy said flexible resin and impregnating said coil with a high temperature resistant material selected from the class consisting of silicone resins, inorganic phosphates, ceramic frits and sodium silicate material.

2. The method of forming electrical coils which comprises overlaying a conductor with a glass serving, impregnating said serving with a flexible inorganic resin selected from the class consisting of phenolic resins, modified phenolic resins, polyvinylal resins, modified polyvinylal resins, acrylic resins, epoxy resins, polyethylene resins and polyester resins, curing said flexible resin, forming said conductor into a coil, heating said coil at an elevated temperature to remove said flexible resin, impregnating said coil with a high temperature resistant silicone resin and curing said silicone resin.

3. The method of forming an electrical coil which comprises overlaying a conductor with glass serving, impregnating said serving with a flexible oil-modified phenol formaldehyde resin, curing said flexible resin, forming said conductor into a coil, heating said coil to remove said flexible resin, impregnating said coil with a high temperature resistant silicone resin and curing said silicone resin.

4. The method of forming electrical coils which comprises overlaying a conductor with a porous serving of inorganic material, impregnating said inorganic material and bonding it to said conductor with a flexible organic resin selected from the group consisting of phenolic resins, modified phenolic resins, polyvinylal resins, modified polyvinylal resins, acrylic resins, epoxy resins, polyethylene resins and polyester resins, curing said flexible resin, forming said conductor into a coil, heating said coil to remove said flexible resin and impregnating said coil with a high temperature resistant inorganic phosphate material.

5. The method of forming electrical coils which comprises overlaying a conductor with a porous serving of inorganic material, impregnating said inorganic material and bonding it to said conductor with a flexible organic resin selected from the group consisting of phenolic resins, modified phenolic resins, polyvinylal resins, modified polyvinylal resins, acrylic resins, epoxy resins, polyethylene resins and polyester resins, curing said flexible resin, forming said conductor into a coil, heating said coil to remove said flexible resin and impregnating said coil with a high temperature resistant ceramic material.

6. The method of forming an electrical coil which comprises overlaying a conductor with glass serving, impregnating said serving with a flexible polyvinylal resin, curing said polyvinylal resin, forming said conductor into a coil, heating said coil to remove said flexible resin, impregnating said coil with a high temperature resistant silicone resin and curing said silicone resin.

7. The method of forming an electrical coil which comprises overlaying a conductor with glass serving, impregnating said serving with a flexible polyvinylal resin, curing said polyvinylal resin, forming said conductor into a coil, heating said coil to remove said flexible resin and impregnating said coil with a high temperature resistant sodium silicate material.

References Cited in the file of this patent

UNITED STATES PATENTS

| | | |
|---|---|---|
| 2,258,221 | Rochow | Oct. 7, 1941 |
| 2,469,099 | Andrus | May 3, 1949 |
| 2,479,417 | Schulman et al. | Aug. 16, 1949 |
| 2,484,214 | Ford et al. | Oct. 11, 1949 |
| 2,495,172 | Leape | Jan. 17, 1950 |
| 2,581,862 | Johnson et al. | Jan. 8, 1952 |
| 2,656,290 | Berberich et al. | Oct. 20, 1953 |
| 2,675,421 | Dexter | Apr. 13, 1954 |
| 2,692,218 | Nicoll et al. | Oct. 19, 1954 |
| 2,713,715 | Jenner et al. | July 26, 1955 |
| 2,848,794 | Roth | Aug. 26, 1958 |